A. ZAVELBERG.
ZINC PRODUCING FURNACE.
APPLICATION FILED AUG. 25, 1914.
1,136,304. Patented Apr. 20, 1915.
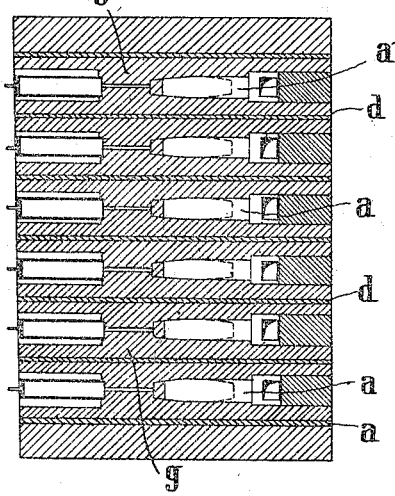
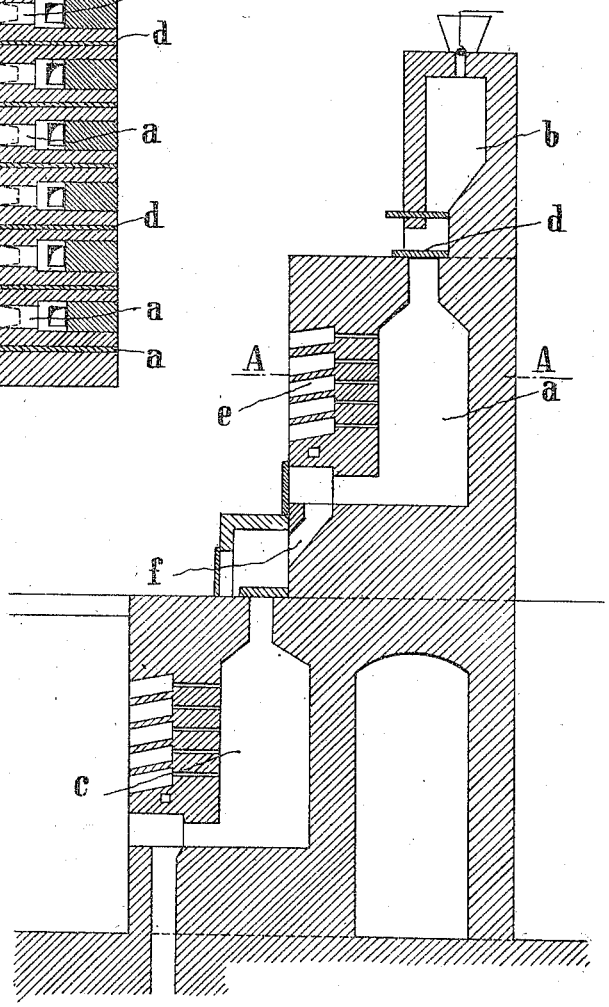

UNITED STATES PATENT OFFICE.

ALBERT ZAVELBERG, OF HOHENLOHEHÜTTE, GERMANY.

ZINC-PRODUCING FURNACE.

1,136,304.   Specification of Letters Patent.   Patented Apr. 20, 1915.

Application filed August 25, 1914. Serial No. 858,525.

*To all whom it may concern:*

Be it known that I, ALBERT ZAVELBERG, a subject of the Emperor of Germany, and resident of Hohenlohehütte, Germany, have invented certain new and useful Improvements in Zinc-Producing Furnaces, of which the following is a specification.

The present invention relates to a furnace for reducing volatile metals, zinc, etc. The furnace consists of a plurality of vertical shafts, arranged alongside of each other. These shafts are separated by vertical walls. Each shaft chamber has a preheating chamber and metal-vapor condensers. A second series of uniform shaft chambers is arranged beneath the first series. The upper shafts are correspondingly connected to the upper shafts by transferring-channels.

Before charging the materials, the shafts are heated by passing heating gases through them, or in any other convenient manner. After that the mixture of ore and reducing material is charged into the upper shafts, after its being preheated in the preheating chamber. In the upper shafts the process is carried out until 35% of the zinc oxid is reduced. The hot materials are then transferred in the lower shafts and the reduction is completed therein.

The furnace has the advantage of a more complete reduction, than by working a single series of shafts, where there is no possibility, of keeping up the temperature long enough for the completion of the process. Also the shafts can be made wider, because the time of the material being treated therein is shorter, and the quantity of the material treated at one time can be enlarged.

To separate the single shafts air-tight from each other vertical layers of pulverized silica are provided in the separating walls. Also vertical heating channels can be provided in these walls, if necessary.

In the accompanying drawings a constructional form of the present invention is exemplified.

Figure 1 is a vertical sectional view through the furnace, Fig. 2 is a horizontal sectional view, on the line A—A of the Fig. 1, on an enlarged scale.

The preheating chamber $b$ is arranged above the upper shaft $a$. The material passes from the preheating chamber into the shaft chamber $a$ by the channel $d$. The condensers $e$ are arranged in front of the shaft chamber. Beneath the shaft $a$ is situated the lower shaft $c$. The material passes from the shaft $a$ by the channel $f$ into the shaft $c$. Between the single shafts are separating walls $g$. In these walls are provided the vertical layers of finely pulverized silicas.

Claims:

1. In a zinc producing furnace the combination of a plurality of vertical, superposed rows of shafts, preheating chambers above the upper row of said shafts, a plurality of juxtaposed chambers within said shafts, walls separating said chambers, means within said walls for producing gas tight partitions between each two of said chambers, condensers in front of, and connected to the chambers of the various rows of shafts, and means for connecting the preheaters with the upper row and this upper row with the lower row of said shafts, substantially as described.

2. In a zinc producing furnace the combination of a plurality of vertical, superposed rows of shafts, a preheating chamber above the upper row of said shafts, a plurality of juxtaposed chambers formed in said shafts, walls separating each two of said chambers, vertical layers of finely pulverized silicas within said walls, condensers in front of and connected to the chambers of the various rows of shafts, and means for connecting the preheater with the upper, and the upper with the lower rows of shafts, substantially as described.

In testimony whereof I affix my signature in presence of two witnesses.

ALBERT ZAVELBERG.

Witnesses:
 WILHELM GORGS,
 ERICH FUNK.